(12) United States Patent
Poon et al.

(10) Patent No.: US 6,347,045 B1
(45) Date of Patent: Feb. 12, 2002

(54) NOISE CANCELING APPARATUS FOR A POWER CONVERTER

(75) Inventors: Ngai Kit Poon, Kowloon; Joe Chui Pong Liu; Man Hay Pong, both of Hong Kong, all of (HK)

(73) Assignee: The University of Hong Kong, Hong Kong (HK)

( * ) Notice: Subject to any disclaimer, the term of this patent is extended or adjusted under 35 U.S.C. 154(b) by 0 days.

(21) Appl. No.: 09/625,091

(22) Filed: Jul. 25, 2000

(51) Int. Cl.$^7$ ................................................ H02M 1/12
(52) U.S. Cl. ......................................................... 363/39
(58) Field of Search ............................. 363/39, 40, 45, 363/46, 47

(56) References Cited

U.S. PATENT DOCUMENTS

| | | | |
|---|---|---|---|
| 4,257,087 A | | 3/1981 | Cuk |
| 4,274,133 A | * | 6/1981 | Cuk et al. ..................... 363/39 |
| 4,937,540 A | * | 6/1990 | Carlson et al. ................ 333/12 |
| 5,038,263 A | | 8/1991 | Marrero et al. |
| 5,323,304 A | * | 6/1994 | Woodworth .................. 363/47 |
| 5,760,571 A | * | 6/1998 | Latham, II et al. ......... 323/274 |
| 6,008,999 A | | 12/1999 | Marrero |

OTHER PUBLICATIONS

"A New Improved Boost Converter With Ripple Free Input Current Using Coupled Industors," Power Electronics and Variable Speed Drives Sep. 21–23, 1998, Conference Publication No. 456 © IEE 1998 (pp. 592–599).

"Input Ripple Current Cancellation Technique Resulting In Less Differential Mode Noise Current," Poon, Franki N.K. et al., Department of Electrical and Electronic Engineering, Hong Kong University (6 pgs.).

* cited by examiner

Primary Examiner—Adolf Deneke Berhane
(74) Attorney, Agent, or Firm—Jones, Day, Reavis & Pogue (57) ABSTRACT

A noise canceling apparatus is provided that uses magnetically-coupled windings to cancel noise currents or noise voltages from a power converter. The apparatus may include a series voltage source or a shunt current source that is placed at input or output terminals of a power converter to eliminate the noise generated from the power converter.

48 Claims, 7 Drawing Sheets

NOISE CANCELING APPARATUS FOR A POWER CONVERTER

BACKGROUND OF THE INVENTION

1. Field of the Invention

This invention generally relates to the field of power converters. More specifically, the invention relates to the field of reducing noise in power converters such as AC to DC converters, DC to AC converters or DC to DC converters.

2. Background of the Invention

Figure 1:
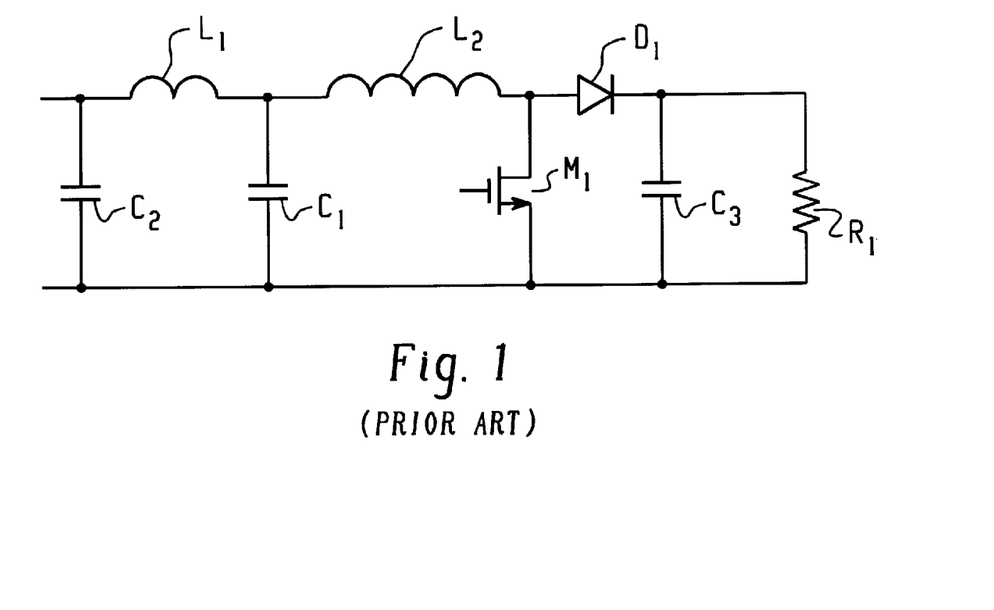
FIG. 1(Prior Art) is a simplified equivalent circuit of a boost converter with a filtering circuit at the input terminal.

A modern switching-mode power converter is light weight and provides high efficiency power conversion. One of the problems with this type of converter, however, is that it generates undesirable switching noise. This switching noise manifests itself as a ripple voltage or ripple current that is generated by the switching-mode at the input or output side of the converter. Reduction of such ripple voltage or current becomes a necessary design requirement in order to comply with international standards. Some prior art provides a means to reduce such ripple current. For example, a traditional means to suppress ripple voltage or current is by implementing a passive filter. As shown in FIG. 1, a prior art converter implements a simple LC circuit. A pair of inductors, $L_1$ and $L_2$ are coupled to a pair of capacitors $C_1$ and $C_2$. Together, these components are coupled to a converter that is modeled as a diode $D_1$, a capacitor $C_3$, a resistor $R_1$ and a transistor $M_1$ that acts as a switch for the converter. A passive filter, however, requires bulky components that take up the limited space within the power converter. Other prior art work implements active cancellation techniques to reduce the ripple noise. For example, in U.S. Pat. No. 4,274,133 to Cuk a converter is disclosed that cancels ripple current by matching a coupling coefficient of two inductors within the converter. In U.S. Pat. No. 5,038,263 to Marrero a circuit is disclosed with a winding coupled to the main transformer of the converter for diverting ripple current to a capacitor. The coupling ratio of the transformer windings reduces the ac ripple current input switching. In Marrero, an inductor is coupled in series with the input to provide constant current. This inductor, however, is bulky and adds an extra component in the power conversion path. In U.S. Pat No. 6,008,999 also to Marrero a converter is disclosed having an additional winding that effects the output inductance of the converter. The coupling ratio of the additional winding and output winding reduces input and output switching ripple.

These prior art methods have drawbacks that limit the utility of the power converter. For example, traditional passive filters require bulky inductors and capacitors that increase component count and space requirements. Known active noise cancellation techniques reduce component size and count, but require careful magnetic coupling between each winding in the main magnetic component. The cancellation effect is not achieved in these circuits without a tightly-coupled magnetic field. The main magnetic component must be made precisely to satisfy both power conversion and noise cancellation requirements. This becomes an added constraint to the design and increases the difficulty to manufacture the converter.

SUMMARY OF THE INVENTION

The present invention provides a general solution for canceling ripple current generated by a power converter. In general, two methods are provided, a series voltage source or a shunt current source, which are placed at the input terminals of a power converter to eliminate ripple current generated by the converter. This noise cancellation apparatus can be applied to any power converter because it is a separate unit that captures the noise signal and generates a cancellation signal equal in magnitude, but opposite in phase to the noise signal, in order to reduce the undesirable noise, such as switching voltage or ripple current of a switching-mode power supply.

According to one aspect of the invention, an AC voltage can be inserted in series with the input terminal of the power converter to reduce the noise voltage. The AC voltage is equal in magnitude but opposite in phase to the noise voltage generated by an AC noise current, or the equivalent of an AC noise current, coupled to the input impedance of the power converter. The noise voltage at the input is thus cancelled.

According to another aspect of the invention, a shunt AC current source can be inserted in parallel with the input terminal of a power converter. If the shunt AC current has equal magnitude, but opposite phase, of the noise current generated by the power converter, then the AC current flow into the input terminal is cancelled.

According to yet another aspect of the invention, an AC voltage can be inserted in series with the input terminal of a power converter. This voltage source can be derived from a noisy voltage node or its equivalent within the converter. Voltage scaling is provided by impedance networks and this voltage source can cancel out noise at the converter input.

The design of these cancellation circuits, unlike traditional filter designs, is not dependent on converter input source impedance. The noise cancellation can also be incorporated with a traditional filter to further reduce the noise level associated with the ripple current and voltage.

Accordingly, it is an object of the present invention to provide noise cancellation circuits for power converters. The noise cancellation circuits can be placed on the input terminals or output terminals of the power converter. The noise reduction apparatus can reduce the noise of different topologies of power converters. Furthermore, the noise reduction apparatus has a low component count and reduces the size of the components in the design.

These and other objects of the present invention will become apparent to those skilled in the art from the following detailed description of the invention and from the accompanying drawings.

DESCRIPTION OF THE PREFERRED EMBODIMENTS

In general, noise detected at the input of a switching power converter is generated by a pulsating current or a pulsating voltage within the converter. Each of these noise sources is present in switching power converters, but which noise source dominates the noise signal depends on the converter. If the converter includes high pulsating current, then the pulsating current model may be the most appropriate model for noise reduction. If the converter includes a high pulsating voltage, however, then the pulsating voltage model may be the most appropriate model for noise reduction. These models form the basis for the generation of cancellation signals to eliminate noise at the input.

Figure 2A:
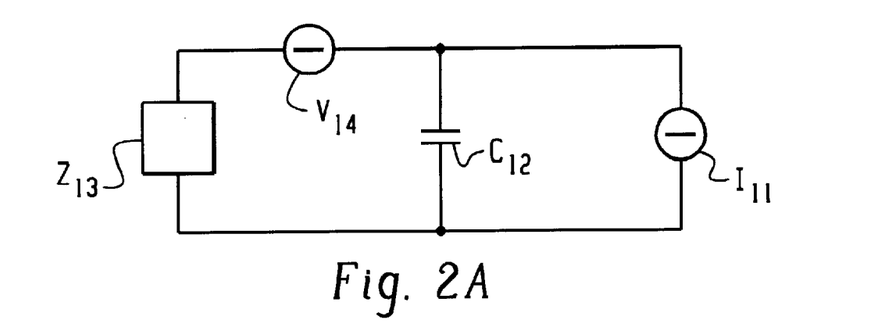
FIG. 2A is a schematic diagram of a circuit showing a series voltage noise canceling source controlled by converter noise current.

FIG. 2A is a schematic diagram of a circuit showing a series voltage noise-canceling source controlled by converter noise current. The current-based noise source is modelled by a switching current source $I_{11}$. An input capacitor $C_{12}$ is in parallel to the input and functions as an energy storage element. A series impedance of the input, $Z_{13}$, is the modeled impedance of the converter. In order to eliminate noise at $Z_{13}$, an active voltage source, $V_{14}$, is put in series with the input. This voltage source is matched to the current change such that the voltage source changes oppositely to the ripple voltage across capacitor $C_{12}$, thus canceling the AC voltage that would have appeared across $Z_{13}$ and eliminating input noise. A direct method for matching the voltage source to the noise is to couple the current change at $I_{11}$ to the series voltage source $V_{14}$.

Figure 2B:
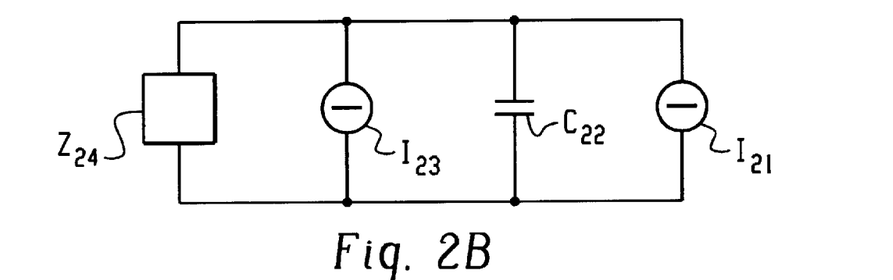
FIG. 2B is a schematic diagram of a circuit showing a parallel noise canceling source controlled by converter noise current.

FIG. 2B is a schematic diagram of a circuit showing a parallel noise canceling source controlled by converter noise current. A switching source $I_{21}$ represents a current-based noise source. An input capacitor $C_{22}$ is in parallel to the input and functions as an energy storage element. A series impedance of the input, $Z_{24}$, is the modeled impedance of the converter. In order to eliminate noise at $Z_{24}$, an active current source, $I_{23}$, is coupled in parallel to the input. This current source produces a current opposite to that of the noise source $I_{21}$ so that the input impedance $Z_{24}$ does not see any ripple current.

Figure 2C:
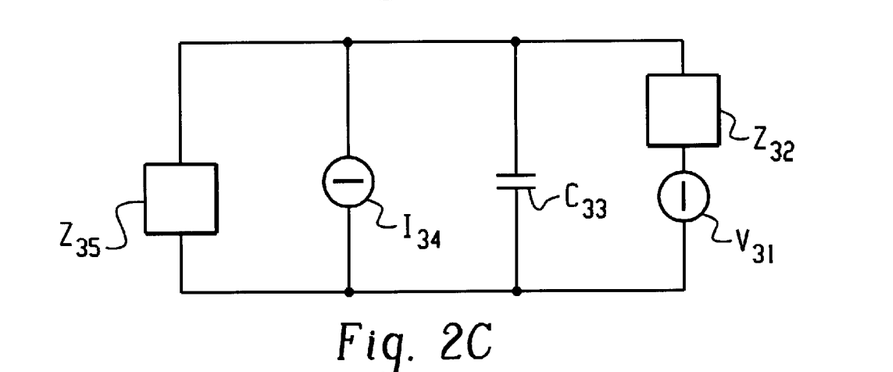
FIG. 2C is a schematic diagram of a circuit showing a parallel noise canceling source controlled by converter noise voltage.

FIG. 2C is a schematic diagram of a circuit showing a parallel noise canceling source controlled by converter noise voltage. A voltage based noise source is represented by pulsating voltage source $V_{31}$ in series with an impedance $Z_{32}$. A capacitor $C_{33}$ is parallel to the input. A series impedance of the input, $Z_{35}$, is the modeled impedance of the converter. In order to eliminate noise at $Z_{35}$, an active current source $I_{34}$ is coupled in parallel to the input. The current source $I_{34}$ produces a current opposite to that drawn by the noise source $V_{31}$. The impedance $Z_{35}$ does not see any ripple current. A method for matching the voltage noise source to the current source $I_{34}$ is to directly couple the current source $I_{34}$ to the noise source $V_{31}$.

Figure 2D:
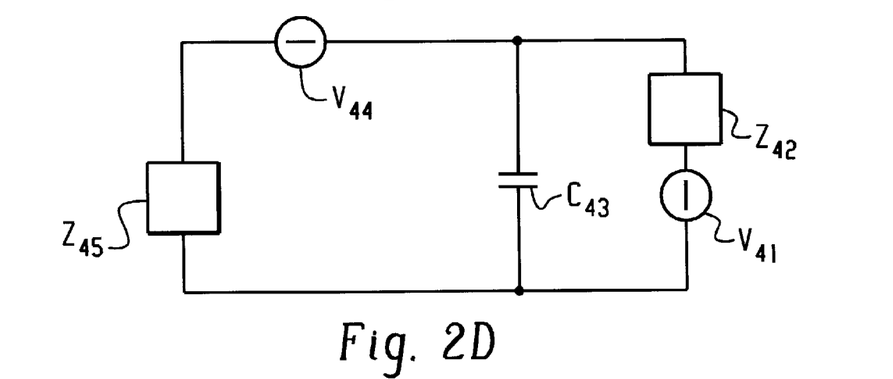
FIG. 2D is a schematic diagram of a circuit showing a series voltage noise canceling source controlled by converter noise voltage.

FIG. 2D is a schematic diagram of a circuit showing a series voltage noise canceling source controlled by converter noise voltage. A voltage based noise source is represented by pulsating voltage source $V_{41}$ in series with an impedance $Z_{42}$. A capacitor $C_{43}$ is parallel to the input. A series impedance of the input, $Z_{35}$, is the modeled impedance of the converter. In order to eliminate noise at $Z_{35}$, an active voltage source $V_{44}$ is coupled in series to the impedance $Z_{45}$. This voltage source is matched to the current change such that the voltage source changes oppositely to the ripple voltage across capacitor $C_{43}$, thus canceling the AC voltage that would have appeared across $Z_{45}$ and eliminating input noise. The voltage source $V_{44}$ produces a voltage opposite to that of the noise source $V_{41}$ so that the input impedance $Z_{24}$ does not see any ripple voltage.

The schematic diagrams of FIGS. 2A through 2D represent the idealized control mechanism for reducing ripple noise by using either a shunt current (FIGS. 2B and 2C) or by using a voltage source (FIGS. 2A and 2D). The use of the shunt current or voltage source as a controller is applicable to a circuit where the ripple noise is modeled as a current noise source (FIGS. 2A and 2B) or as a voltage noise source (FIGS. 2C and 2D).

Figure 3:
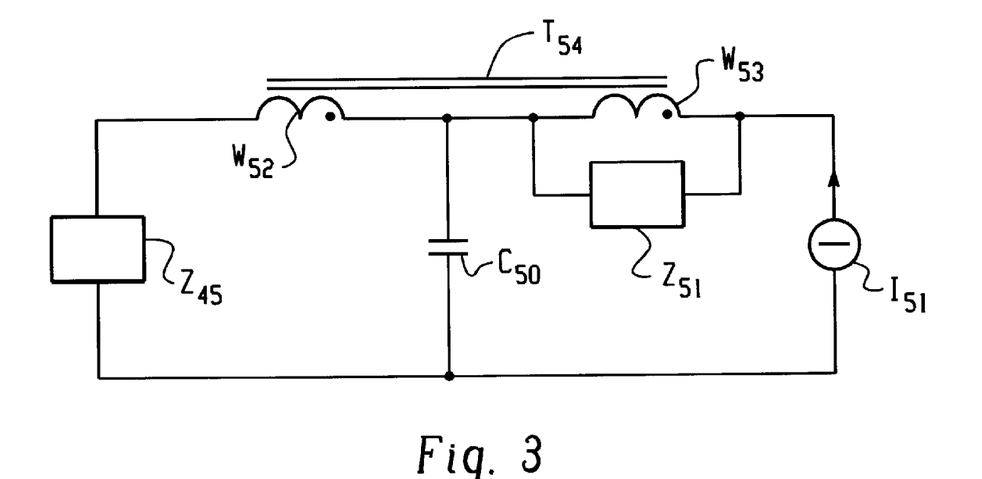
FIG. 3 is a preferred embodiment of the present invention using a series voltage source to reduce noise created by ripple.

Turning now to FIG. 3, a preferred embodiment of the present invention is shown in which a series voltage source is used to reduce noise created by ripple. This noise canceling apparatus is an embodiment of the idealized voltage source/ripple current configuration of FIG. 2A. The apparatus includes a transformer $T_{54}$ that is coupled to a pair of windings, $W_{52}$ and $W_{53}$. The winding $W_{53}$ is in parallel to an impedance $Z_{51}$. Both the $W_{53}$ winding and the $Z_{51}$ impedance are in series with a ripple noise current source $I_{51}$. An input impedance $Z_{45}$ is in series with the $W_{52}$ winding and an energy storing capacitor $C_{50}$. The energy storing capacitor $C_{50}$ is, in turn, in series with the $W_{53}$ winding and the current source $I_{51}$.

A cancellation voltage is generated by detecting the voltage drop across the impedance $Z_{51}$ measured across the winding $W_{53}$ caused by the switching ripple current $I_{51}$. The cancellation voltage across $W_{52}$ is determined by the transformer ratio of $T_{54}$ and the impedance $Z_{51}$, because the turn ratio of $W_{52}$ and $W_{53}$ is unity.

The following equations show the mathematical relationship between voltage drops across components in the circuit, $$v(C_{50})=i(I_{51}).Z(C_{50}) \qquad (1)$$

$$v(C_{50})=v(W_{52}) \qquad (2)$$

$$v(W_{52})=i(I_{51}).(Z_{51}//Z_{LT1}) \qquad (3)$$

where, $Z_{LT1}$ is the input impedance of the transformer $T_{54}$ at winding $W_{53}$.

Solving the above equations, $Z_{51}$ can be found for zero input noise as:

$$Z_{51} = \frac{Z(C_{50})Z_{LT1}}{Z_{LT1} - Z(C_{50})} \quad (4)$$

Assuming $Z_{LT1} \gg Z(C_{50})$, hence $Z_{51}$ can be approximated as, $$Z_{51} = Z(C_{50}), \quad (5)$$

The above assumption and the result shows that a component that has an impedance equal to that of the primary filter capacitor ($C_{50}$) and coupled in parallel to winding $W_{53}$ of transformer $T_{54}$ can provide cancellation of the noise voltage. If the components of the filter include components other than a capacitor, the impedance $Z_{51}$ is modeled as the total impedance of the primary filter components.

If $Z_{51}$ is equal to $Z(C_{50})$, then the voltage drop on both impedances are equal because the parallel impedance of $T_{54}$ is large. Transformer $T_{54}$ thus provides an equal amplitude, but opposite-phase, waveform across the $W_{52}$ winding to cancel out the voltage change across $C_{50}$ due to the noise current source $I_{51}$.

In a more general case where the turn ratio of $W_{52}$ and $W_{53}$ is not equal to one, the condition for noise cancellation is $$\frac{Z_{51}}{Z(C_{50})} = \frac{N(W_{53})}{N(W_{52})} \quad (6)$$

where $N(W_{53})$ is the number of turns of winding $W_{53}$ and $N(W_{52})$ is the number of turns of winding $W_{52}$.

Figure 4:
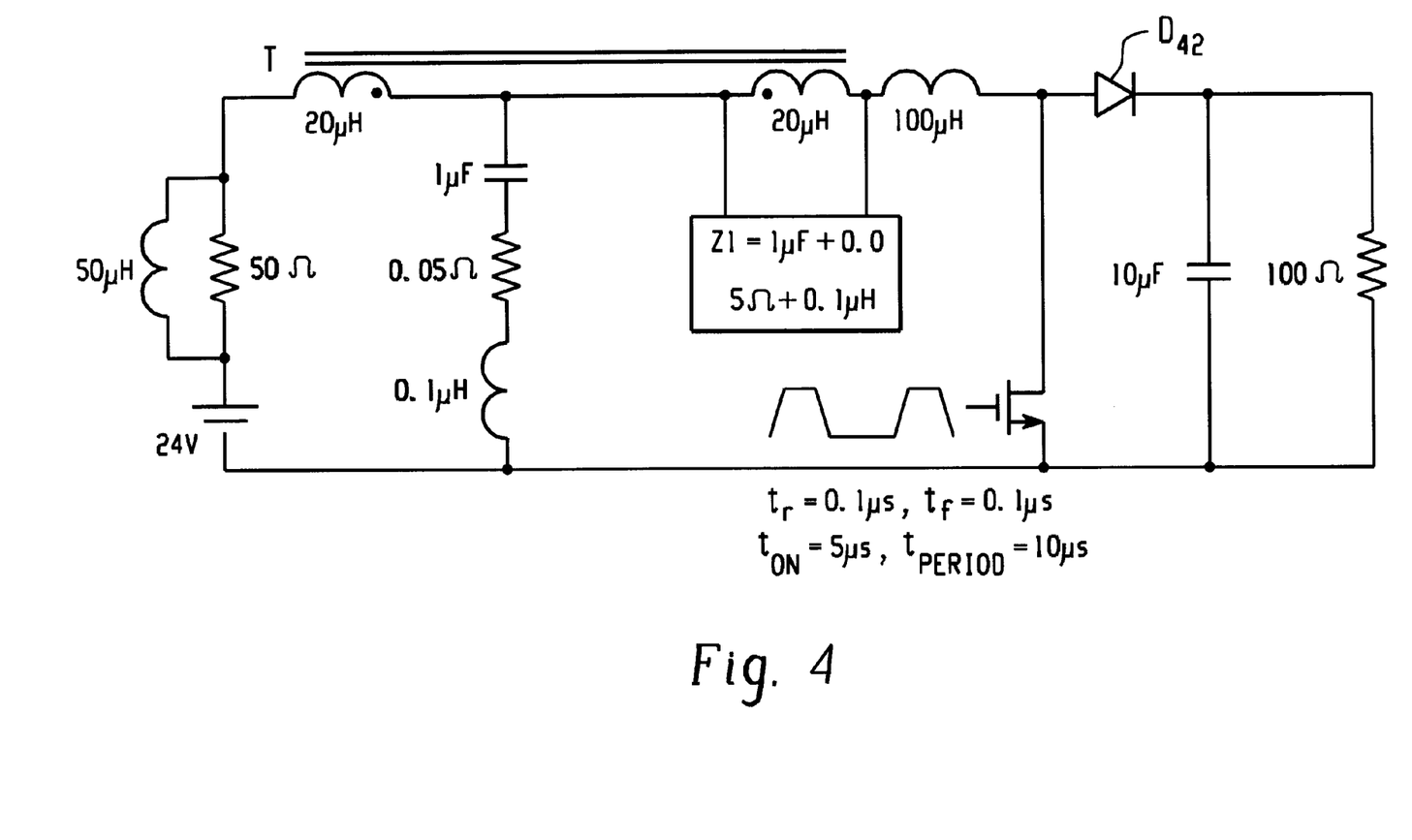
FIG. 4 is an example circuit of the preferred embodiment of FIG. 3 coupled to a boost converter.

FIG. 4 is an example circuit of the preferred embodiment of FIG. 3 coupled to a boost converter. The noise source $I_{51}$ in FIG. 3 is replaced by the boost converter. The boost converter is modeled as a 100 uH inductor in series with an input transistor and in parallel with a 10 uF capacitor and a 100 Ω resistor through a diode $D_{42}$. An input waveform having a rise time of 0.1 us, a fall time of 0.1 us, a peak time of 5 us and a period of 10 us is input into the circuit through the gate of the transistor. The capacitor $C_{50}$ is a 1 uF capacitor that is in series with a 0.05 Ω resistor and a 0.1 uH inductor. Each winding $W_{52}$ and $W_{53}$ is a 20 uH winding. The impedance placed in parallel to the 20 uH winding $W_{53}$ must then be equal to the combined impedance of the 1 uF capacitor, the 0.050Ω resistor and the 0.1 uH inductor. The transformer $T_{54}$ then generates a voltage drop in the $W_{52}$ winding that is equal in magnitude to the sensed voltage drop across the $W_{53}$ winding, but the voltage drop is opposite in phase.

Figure 5A:
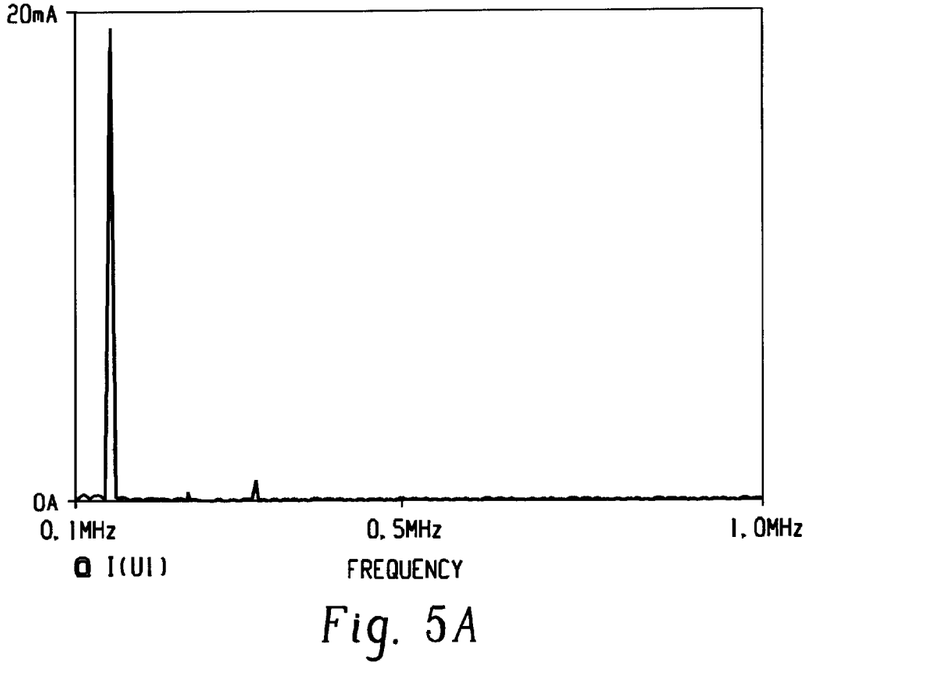
FIG. 5A is an example input noise spectrum of a boost converter without noise cancellation.

FIG. 5A is an example input noise spectrum of a boost converter without noise cancellation. The input current spectrum was calculated without the coupling transformer $T_{54}$, but with the 20 uH winding $W_{53}$ placed in series with the boost converter. The first harmonic of the noise signal contributes most of the amplitude to the noise spectrum.

Figure 5B:
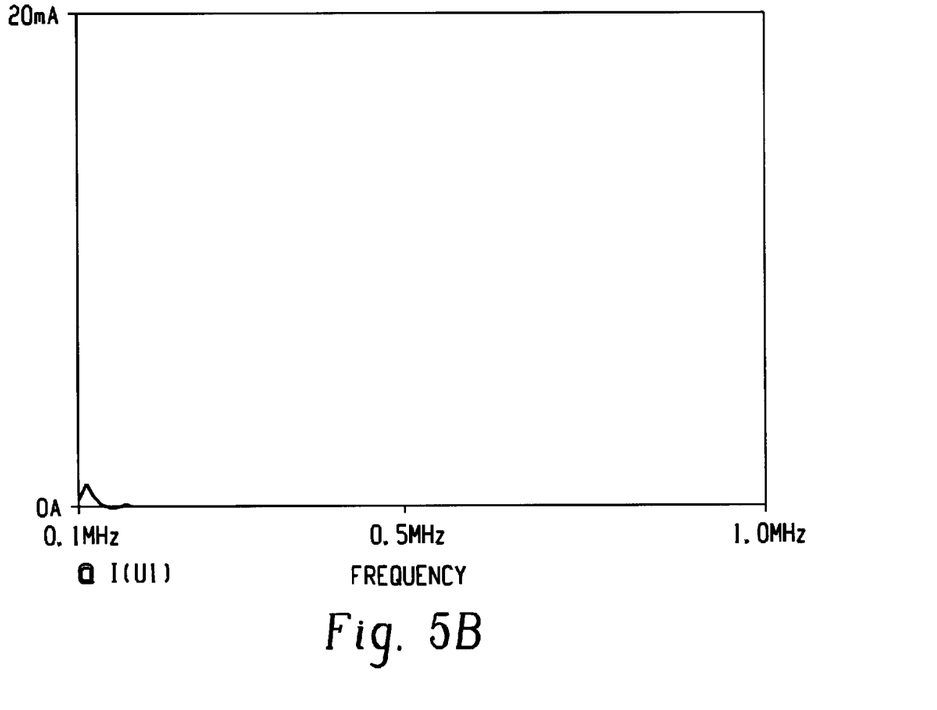
FIG. 5B is an example input noise spectrum of the boost converter with noise cancellation of FIG. 4.

FIG. 5B is an example input noise spectrum of a boost converter with noise cancellation as shown in FIG. 4. The boost converter with noise cancellation has a noise spectrum that is dramatically attenuated by using a small size 20 uH 1:1 cancellation transformer $T_{54}$ with a parallel low voltage 1 uF capacitor.

Figure 6A:
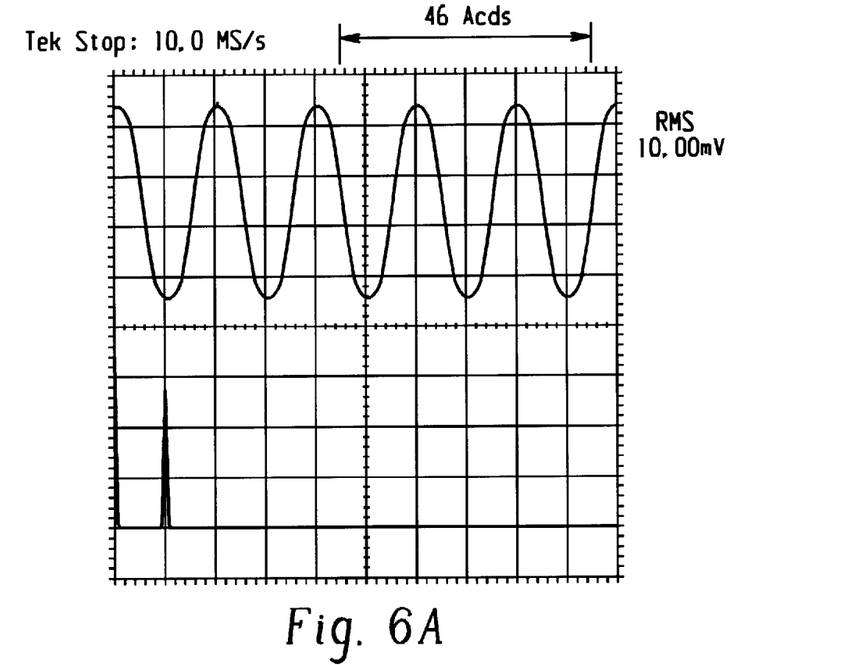
FIG. 6A is a plot showing the measured input ripple current of the boost converter without noise cancellation in the time domain and in the frequency domain.
Figure 6B:
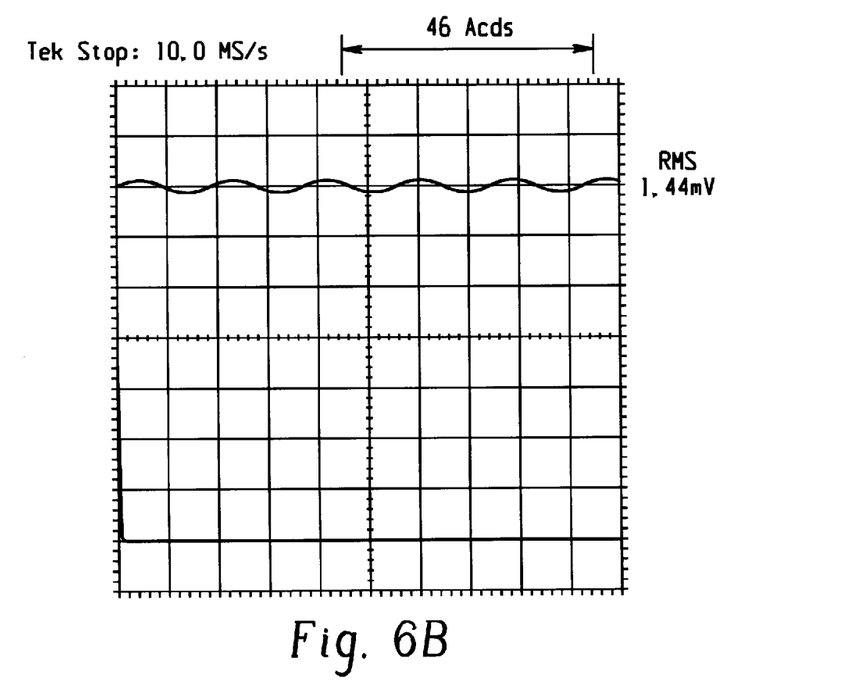
FIG. 6B is a plot showing the measured input ripple current of the boost converter with noise cancellation in the time domain and in the frequency domain.

FIG. 6A is a plot showing the measured input ripple current of the boost converter without noise cancellation in the time domain (upper plot) and frequency domain (lower plot). FIG. 6B is a plot showing the measured input ripple current of the boost converter with noise cancellation in the time domain (upper plot) and frequency domain (lower plot). FIG. 6A shows that a first harmonic of the switching ripple current has a large magnitude and the accompanying sinusoidal wave in the time domain is related to the large magnitude of the first harmonic. After adding the cancellation circuit to the converter, the first harmonic of the switching ripple current is reduced, as shown in FIG. 6B. The reduction in the frequency domain corresponds to the relatively flat waveform signal in the time domain.

Figure 7:
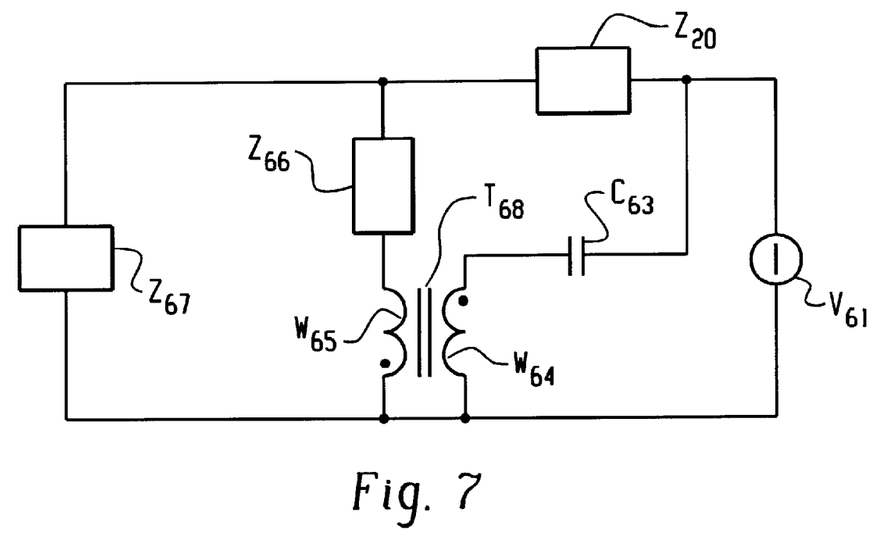
FIG. 7 is another preferred embodiment of the present invention coupling a parallel current source derived from the noise voltage to a converter in order to reduce ripple.

Turning now to FIG. 7, another preferred embodiment of the present invention couples a parallel current source derived from the noise voltage to a converter in order to reduce ripple. This embodiment corresponds to the idealized noise cancellation method shown in FIG. 2C. In this circuit, a noise voltage $V_{61}$ produces noise at the input. An impedance $Z_{20}$ is in series with the noise voltage $V_{61}$. A capacitor $C_{63}$ and a winding $W_{64}$ are in parallel with the noise voltage. A transformer $T_{68}$ couples the winding $W_{64}$ to a winding $W_{65}$. An impedance $Z_{66}$ is placed in series with the $W_{65}$ winding. The windings $W_{64}$ and $W_{65}$ are both parallel to an input impedance $Z_{67}$.

The transformer $T_{68}$ detects the noise voltage $V_{61}$ and converts it to a shunt current source. The transformer $T_{68}$ accomplishes these functions with the windings $W_{64}$ and $W_{65}$. Winding $W_{64}$ captures the noise voltage and winding $W_{65}$ produces the compensation current. The capacitor $C_{63}$ is placed in series with winding $W_{64}$ so that it picks up AC noise only and does not interfere with normal converter operation. The impedance $Z_{66}$ is placed in series with winding $W_{65}$ in order to produce a corresponding noise canceling current.

When a noise current is generated by the noisy voltage source $V_{61}$ through the impedance $Z_{20}$, then the impedance $Z_{66}$ drives a corresponding current which cancels the noisy current. Assuming the magnetizing impedance of sensing winding $W_{64}$ is high, the condition for null noise current flow at the input impedance $Z_{67}$ can be approximately related as $$\frac{Z_{66}}{Z_{20}} = \frac{N(W_{65})}{N(W_{64})} \quad (7)$$

where $N(W_{65})$ is the number of turns of winding $W_{65}$ and $N(W_{64})$ is the number of turns of winding $W_{64}$.

Impedance networks are needed in this circuit, but they may not necessarily require extra components, because the impedances may be components of the corresponding switching converter. For example $Z_{20}$ may be the input or output inductor of a boost or buck converter, respectively.

Figure 8:
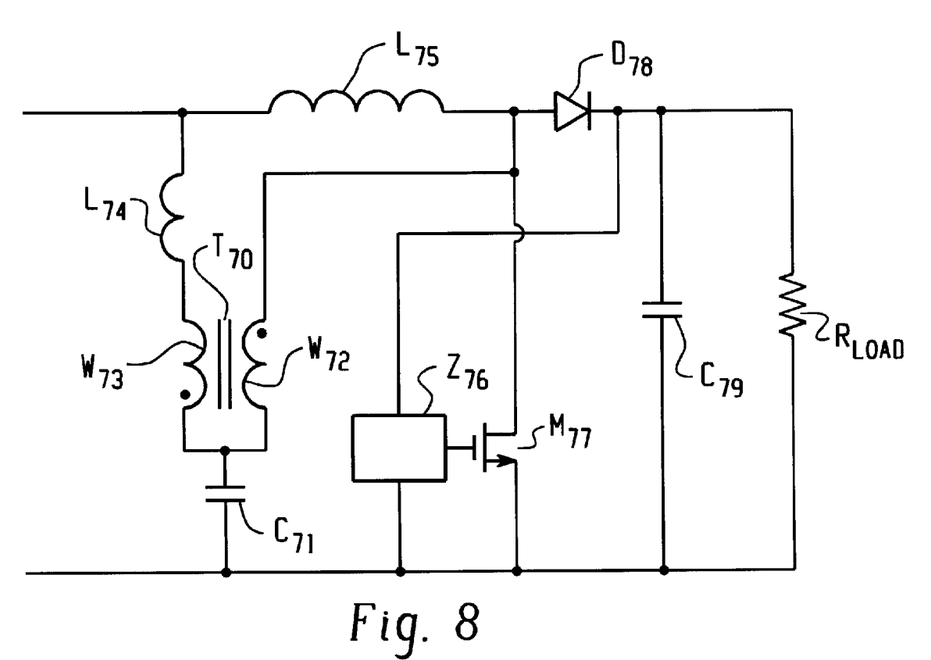
FIG. 8 is an example circuit of the embodiment of FIG. 7 coupled to a boost converter.

Turning now to FIG. 8, an example circuit of the embodiment of FIG. 7 coupled to a boost converter is set forth. The circuit is applied to a boost converter comprising an inductor $L_{75}$, transistor $M_{77}$, diode $D_{78}$, resistor $R_{load}$ and output capacitor $C_{79}$. The transistor $M_{77}$ is controlled through a source 76.

The noise cancellation circuit comprises a transformer $T_{70}$ which has two windings $W_{72}$ and $W_{73}$. A sensing winding $W_{72}$ detects noise voltage across the switch $M_{77}$ and transfers the noise signal to a compensating winding $W_{73}$. A capacitor $C_{71}$ is coupled in series with an inductor $L_{74}$. An inductor $L_{75}$, which may be the input inductor of the boost converter, is in series with the components of the boost converter. The inductor $L_{74}$ and the capacitor $C_{71}$ are an impedance network to match the impedance of the input inductor $L_{75}$ and the output capacitor $C_{79}$. The impedance network translates the noise voltage signal derived from the sensing winding $W_{72}$ and passed to the compensating winding $W_{73}$ into an equal magnitude, opposite phase current signal. The current signal thus cancels out the noise at the input.

Figure 9:
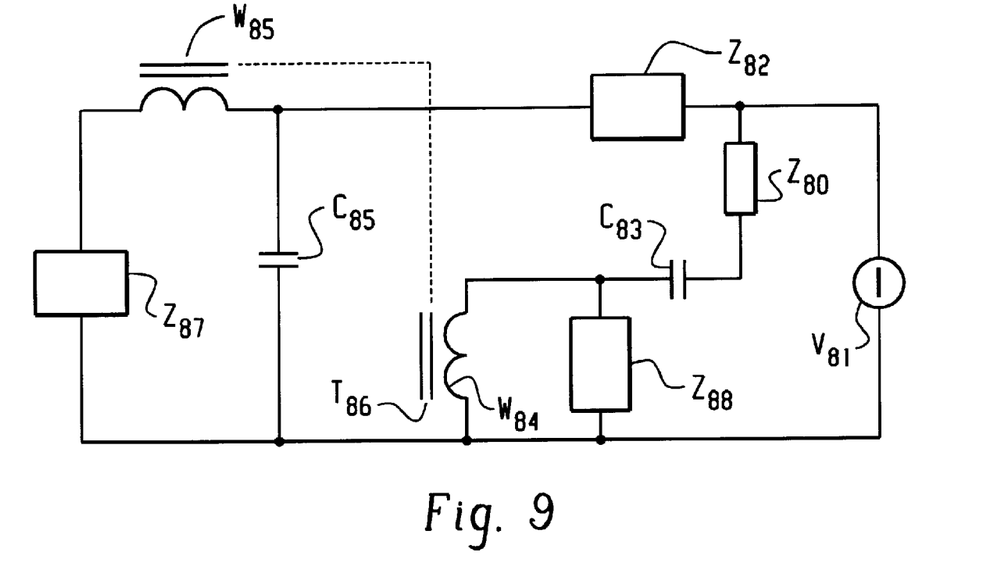
FIG. 9 is another preferred embodiment of the present invention coupling a series voltage source derived from the noise voltage to a converter in order to reduce ripple.

FIG. 9 is another preferred embodiment of the present invention coupling a series voltage source derived from the noise voltage to a converter in order to reduce ripple. It consists of a noise voltage source $V_{81}$ which is connected in series with an impedance $Z_{82}$. An input impedance of the converter is modeled as $Z_{87}$ and a capacitor $C_{85}$. The cancellation circuit consists of a transformer $T_{86}$ coupled to a pair of windings $W_{84}$ and $W_{85}$. The sensing winding $W_{84}$ is in series with a capacitor $C_{83}$ and an impedance $Z_{80}$. An impedance network $Z_{88}$ is parallel to the sensing winding $W_{84}$. The compensating winding $W_{85}$ is in series with the impedance $Z_{82}$ and the noise voltage source $V_{81}$.

In this circuit, the transformer $T_{86}$ detects the noise voltage $V_{81}$, and converts it to a series voltage source. The sensing winding $W_{84}$ captures the noise voltage. The compensating winding $W_{85}$ produces a compensating voltage in series with the noise voltage $V_{81}$. The capacitor $C_{83}$ is placed in series with winding $W_{84}$ so that it picks up AC noise only and does not interfere with normal converter operation. The impedance network $Z_8$ and the impedance $Z_{80}$ adjust the noise cancellation characteristics of the circuit. Winding $W_{85}$ is placed in series with the input so that it produces a voltage signal equal in magnitude but opposite in phase to cancel the noise voltage.

Figure 10:
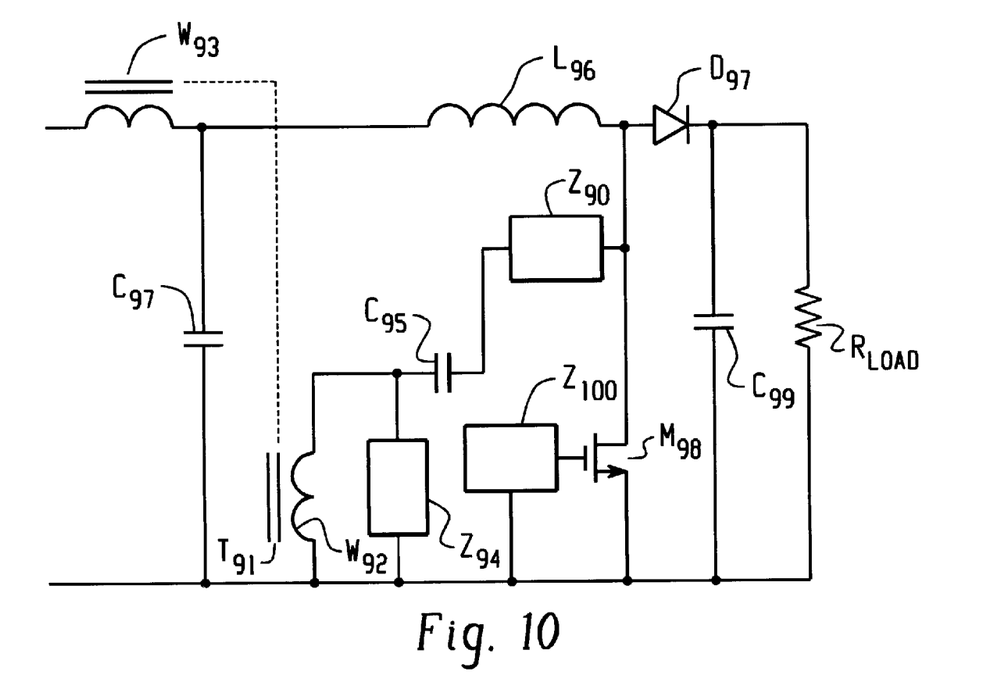
FIG. 10 is an example circuit of the embodiment of FIG. 9 coupled to a boost converter.

FIG. 10 is an example circuit of the embodiment of FIG. 9 coupled to a boost converter. The boost converter is modeled as a circuit and comprises an inductor $L_{96}$, a transistor $M_{98}$, a diode $D_{97}$, a resistor $R_{load}$ and an output capacitor $C_{99}$. A source 100 controls the switching of the transistor $M_{98}$.

The cancellation circuit is modeled as a pair of windings $W_{92}$ and $W_{93}$ coupled by a transformer $T_{91}$. The sensing winding $W_{92}$ is in parallel with an impedance network $Z_{94}$ and in series with a capacitor $C_{95}$ and an impedance $Z_{90}$.

Winding $W_{92}$ detects noise voltage across the switch $M_{98}$ and transfers the noise signal to winding $W_{93}$. The impedance network $Z_{94}$, the impedance $Z_{90}$, and the capacitor $C_{95}$ are tuned to couple the noise canceling voltage across the winding $W_{93}$ to the voltage noise controlled through the switch $M_{98}$. These components are modeled to match the impedance of the booster converter components $L_{96}$ and $C_{99}$. The voltage signal generated across the $W_{93}$ winding is thus equal in magnitude but opposite in phase to the voltage drop generated across the transistor $M_{98}$.

Each of the three embodiments of the cancellation circuit described above can be applied to the input or output of a power converter. Coupling the cancellation circuit to the output cancels output ripple while coupling the cancellation circuit to the input cancels input ripple. The configuration and operating principles are the same for both input cancellation and output cancellation.

The preferred embodiments described with reference to the attached drawing figures are presented only to demonstrate certain examples of the invention. Other elements, steps, methods, and techniques that are insubstantially different from those described above and/or in the appended claims are also intended to be within the scope of the invention.

What is claimed is:

1. A noise canceling circuit for use with a power converter that generates a noise current, comprising:
   a transformer having a first winding and a second winding that are magnetically coupled and are configured in series to the power converter;
   an impedance network coupled in parallel to the first winding; and
   a filter network coupled in series with the second winding and in parallel with the power converter, wherein the impedance of the impedance network and the filter network are approximately equivalent;
   wherein the noise current is coupled to the first winding of the transformer, which measures a corresponding voltage drop across the first impedance network and causes the second winding to generate a noise cancellation voltage that compensates for the noise current generated by the power converter.

2. The noise canceling circuit of claim 1, wherein the filter network comprises a single capacitor.

3. The noise canceling circuit of claim 1, wherein the filter network comprises a capacitor coupled in series with a resistor.

4. The noise canceling circuit of claim 3, wherein the filter network further comprises an inductor.

5. The noise canceling circuit of claim 1, wherein the power converter includes an input port for receiving input power and an output port for providing converted power.

6. The noise canceling circuit of claim 5, wherein the noise canceling circuit is coupled to the input port of the power converter.

7. The noise canceling circuit of claim 5, wherein the noise canceling circuit is coupled to the output port of the power converter.

8. The noise canceling circuit of claim 5, wherein the power converter is coupled to an input power source, and wherein the noise canceling circuit is coupled between the input power source and the input port of the power converter.

9. The noise canceling circuit of claim 1, wherein the inductance of the first winding and the second winding are approximately equivalent.

10. The noise canceling circuit of claim 1, wherein the noise cancellation voltage is an AC noise cancellation voltage.

11. The noise canceling circuit of claim 10, wherein the AC noise cancellation voltage is equal in magnitude but opposite in phase to the corresponding voltage drop across the first impedance network.

12. The noise canceling circuit of claim 1, wherein the cancellation voltage is equal in magnitude but opposite in phase to the corresponding voltage drop across the first impedance network.

13. The noise canceling circuit of claim 1, wherein the power converter is a boost converter.

14. The noise canceling circuit of claim 1, wherein the power converter is a buck converter.

15. The noise canceling circuit of claim 1, wherein the power converter is a switching power converter.

16. The noise canceling circuit of claim 1, wherein the impedance of the noise canceling circuit is substantially less than the input impedance of the power converter.

17. The noise canceling circuit of claim 1, wherein the turn ratio of the first and second windings of the transformer is unity.

18. A noise canceling circuit for use with a power converter that generates a noise voltage, comprising:
   a transformer having a first winding and a second winding that are magnetically coupled and are configured in parallel to each other, wherein the first winding is coupled in parallel to the power converter and the second winding is coupled to an internal node of the switching power converter where the noise voltage is generated; and
   an impedance network coupled in series with the first winding;
   wherein the second winding of the transformer measures the noise voltage at the internal node and causes the first winding to generate a noise cancellation current that compensates for the noise voltage generated by the power converter.

19. The noise canceling circuit of claim 18, wherein the impedance network comprises a single capacitor.

20. The noise canceling circuit of claim 18, wherein the impedance network comprises a capacitor in series with an inductor.

21. The noise canceling circuit of claim 18, wherein the power converter includes an input port for receiving input power and an output port for providing converted power.

22. The noise canceling circuit of claim 21, wherein the noise canceling circuit is coupled to the input port of the power converter.

23. The noise canceling circuit of claim 21, wherein the noise canceling circuit is coupled to the output port of the power converter.

24. The noise canceling circuit of claim 21, wherein the power converter is coupled to an input power source, and wherein the noise canceling circuit is coupled between the input power source and the input port of the power converter.

25. The noise canceling circuit of claim 18, wherein the noise cancellation current is an AC noise cancellation current.

26. The noise canceling circuit of claim 18, wherein a noise cancellation voltage is generated across the impedance network by the noise cancellation current, and wherein the noise cancellation voltage is equal in magnitude but opposite in phase with the noise voltage.

27. The noise canceling circuit of claim 18, wherein the power converter is a switching converter.

28. The noise canceling circuit of claim 27, wherein the switching converter is a boost converter.

29. The noise canceling circuit of claim 28, wherein the boost converter includes an input port, an output port, an inductor coupled in series with the input port, a capacitor coupled in parallel with the output port, a diode coupling the input port to the output port, and a switching transistor coupled in parallel to the output port.

30. The noise canceling circuit of claim 29, wherein the internal node is connected to the output of the switching transistor.

31. The noise canceling circuit of claim 29, wherein the impedance of the impedance network is approximately equivalent to the impedance of the inductor and the capacitor of the switching power converter.

32. A noise canceling circuit for use with a power converter that generates a noise voltage, comprising:
a transformer having a first winding and a second winding that are magnetically coupled, wherein the first winding is coupled in series with the power converter and the second winding is coupled to an internal node of the power converter where the noise voltage is generated; and
an impedance network coupled to the second winding;
wherein the second winding of the transformer measures the noise voltage at the internal node and causes the first winding to generate a noise cancellation voltage that compensates for the noise voltage generated by the power converter.

33. The noise canceling circuit of claim 32, wherein the impedance network comprises a single capacitor coupled in series with the second winding.

34. The noise canceling circuit of claim 32, wherein the power converter includes an input port for receiving input power and an output port for providing converted power.

35. The noise canceling circuit of claim 34, wherein the noise canceling circuit is coupled to the input port of the power converter.

36. The noise canceling circuit of claim 34, wherein the noise canceling circuit is coupled to the output port of the power converter.

37. The noise canceling circuit of claim 34, wherein the power converter is coupled to an input power source, and wherein the noise canceling circuit is coupled between the input power source and the input port of the power converter.

38. The noise canceling circuit of claim 32, wherein the noise cancellation voltage is an AC noise cancellation voltage.

39. The noise canceling circuit of claim 32, wherein a noise cancellation voltage is equal in magnitude but opposite in phase with the noise voltage.

40. The noise canceling circuit of claim 32, wherein the power converter is a switching converter.

41. The noise canceling circuit of claim 40, wherein the switching converter is a boost converter.

42. The noise canceling circuit of claim 41, wherein the boost converter includes an input port, an output port, an inductor coupled in series with the input port, a capacitor coupled in parallel with the output port, a diode coupling the input port to the output port, and a switching transistor coupled in parallel to the output port.

43. The noise canceling circuit of claim 22, wherein the internal node is connected to the output of the switching transistor.

44. The noise canceling circuit of claim 43, wherein the impedance of the impedance network is approximately equivalent to the impedance of the inductor and the capacitor of the switching power converter.

45. A noise canceling circuit for use with a power converter that generates a noise current, comprising:
measurement circuitry coupled to the power converter for measuring the noise current by generating a noise measurement voltage that corresponds to the noise current; and
compensation circuitry coupled to the measurement circuitry and the power converter for generating a noise cancellation voltage in series with the power converter, wherein the noise cancellation voltage is equal in magnitude but opposite in phase with the noise measurement voltage.

46. The noise canceling circuit of claim 45, wherein the measurement circuitry is coupled in series with the power converter and includes a first winding and an impedance network coupled in parallel, wherein the noise current is coupled to the measurement circuitry and passes through the impedance network, thus causing the first winding to measure the noise cancellation voltage.

47. The noise canceling circuit of claim 46, wherein the compensation circuitry includes a second winding magnetically coupled to the first winding and a filter network coupled in series with the second winding and in parallel with the power converter, wherein the impedance of the filter network and the impedance network are approximately equivalent.

48. A noise canceling circuit for use with a power converter that generates a noise voltage, comprising:
measurement circuitry coupled to the power converter for measuring the noise voltage; and
compensation circuitry coupled to the measurement circuitry and the power converter for generating a noise cancellation voltage in series with the power converter, wherein the noise cancellation voltage is equal in magnitude but opposite in phase with the noise voltage.

* * * * *

UNITED STATES PATENT AND TRADEMARK OFFICE
CERTIFICATE OF CORRECTION

PATENT NO. : 6,347,045 B1
DATED : February 12, 2002
INVENTOR(S) : Poon et al.

It is certified that error appears in the above-identified patent and that said Letters Patent is hereby corrected as shown below:

Column 10,
Line 25, delete "22" and insert -- 42 --.

Signed and Sealed this

Fourteenth Day of May, 2002

Attest:

JAMES E. ROGAN
Attesting Officer  Director of the United States Patent and Trademark Office